United States Patent
Nakata et al.

(10) Patent No.: US 6,178,295 B1
(45) Date of Patent: Jan. 23, 2001

(54) LENS MOVEMENT CONTROL DEVICE

(75) Inventors: Masahiro Nakata; Osamu Sato; Makoto Iikawa, all of Saitama (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 09/321,540

(22) Filed: May 28, 1999

(30) Foreign Application Priority Data

May 29, 1998 (JP) .................................................. 10-148840

(51) Int. Cl.$^7$ .................................................. G03B 13/36
(52) U.S. Cl. .................................................. 396/103
(58) Field of Search .................................................. 396/103

(56) References Cited

U.S. PATENT DOCUMENTS

| | | | |
|---|---|---|---|
| 4,284,335 | * 8/1981 | Takemae et al. | 396/103 |
| 4,293,206 | * 10/1981 | Tokutomi et al. | 396/103 |
| 4,482,234 | * 11/1984 | Takagi et al. | 396/103 |
| 4,557,577 | * 12/1985 | Shinoda | 396/103 |
| 4,854,673 | 8/1989 | Tanaka | 359/825 |
| 5,061,954 | * 10/1991 | Toyama et al. | 396/103 |
| 5,227,828 | * 7/1993 | Kirigaya | 396/103 |
| 5,465,130 | * 11/1995 | Eguchi | 396/103 |
| 5,479,234 | * 12/1995 | Kitaoka | 396/103 |
| 5,899,586 | * 5/1999 | Kawanami | 396/103 |

FOREIGN PATENT DOCUMENTS 63-70519  5/1988  (JP) .

* cited by examiner

*Primary Examiner*—W. B. Perkey
(74) *Attorney, Agent, or Firm*—Greenblum & Bernstein, P.L.C.

(57) ABSTRACT

A lens movement control device comprises a lens moving mechanism moving focusing lens groups, and an electrical switch electrically determining a focusing range within which the focusing lens groups can be moved. A lens position sensing system is provided for electrically sensing lens position information corresponding to positions of the focusing lens groups on the optical axis. The lens moving mechanism moves the focusing lens groups within the focusing range, based on the lens position information and the focusing range.

6 Claims, 11 Drawing Sheets

LENS MOVEMENT CONTROL DEVICE

BACKGROUND OF THE INVENTION

1. Field of the Invention

The present invention relates to a lens movement control device, which is provided in an automatic focusing device of a camera, to control a range within which focusing lens groups are moved.

2. Description of the Related Art

Generally, in an ultra-telephoto lens, which is detachably mountable on a camera body, a moving amount of the lens is greater than a normal interchangeable lens. Therefore, if the focusing lens groups are always moveable over the whole range, it might take a long time using an automatic focusing adjustment to obtain an in-focus condition, since a range over which the focusing lens groups are moved is too large. Accordingly, an interchangeable lens, which is provided with a focus limiter by which a moving range of the focusing lens groups is restricted, is proposed.

A conventional focus limiter is constructed in such a manner that a limiter member is extended, by rotating a focus limiter switch, to a position at which the limiter member interferes with support members of the focusing lens groups, so that the moving ranges of the focusing lens groups are restricted (Japanese Unexamined Utility Model Publication No. 63-70519, for example).

However, as the conventional focus limiter has a mechanical member, a number of members is great, thus increasing the manufacturing cost.

SUMMARY OF THE INVENTION

Therefore, an object of the present invention is to provide a lens movement control device, in which a moving range of focusing lens groups is restricted without using a mechanical focus limiter, so that a cost of the lens movement control device is reduced.

According to the present invention, there is provided a lens movement control device a lens moving mechanism, an electrical switch and a lens position sensing system.

The lens moving mechanism moves focusing lens groups, provided in a photographing lens, along an optical axis thereof. The electrical switch electrically determines a focusing range within which the focusing lens groups can be moved. The lens position sensing system electrically senses lens position information regarding positions of the focusing lens groups on the optical axis. The lens moving mechanism moves the focusing lens groups within the focusing range, based on the lens position information and the focusing range.

Further, according to the present invention, there is provided a lens movement control device comprising a lens moving mechanism, a distance information output system and a lens movement limit system.

The lens moving mechanism moves focusing lens groups, provided in a photographing lens, along an optical axis thereof. The distance information output system outputs an electric signal corresponding to a position of at least one of the focusing lens groups. The lens movement limit system controls the lens moving mechanism to stop a movement of at least one of the focusing lens groups, based on the electric signal.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
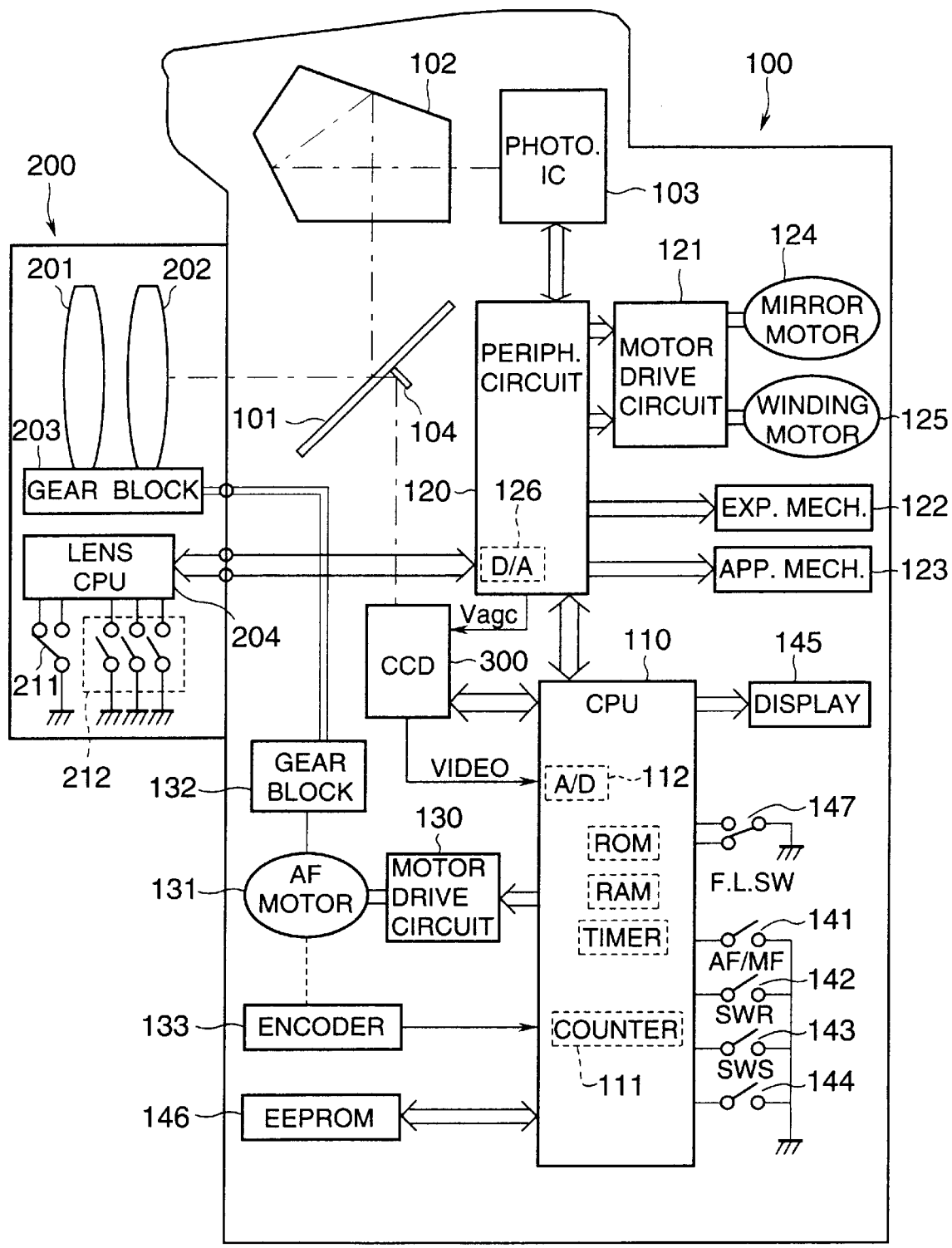
FIG. 1 is a block diagram of a camera in which a lens movement control device of an embodiment of the present invention is mounted.

The present invention will be described below with reference to embodiments shown in the drawings.

FIG. 1 shows an electrical construction of a camera in which a lens movement control device of an embodiment of the present invention is mounted.

A single-lens reflex camera has a camera body 100 and an interchangeable lens 200, which is detachably mountable on the camera body 100. In the camera body 100, a pentagonal prism 102, which is a part of a view finder optical system, is disposed above a quick return mirror 101. Light, passing through a plurality of focusing lens groups 201 and 202, provided in the interchangeable lens 200, is led to an eyepiece lens (not shown) of the view finder optical system through the quick return mirror 101 and the pentagonal prism 102, while a part of the light enters a photometry IC 103. Further, the light passing through the focusing lens groups 201 and 202 is reflected by a sub-mirror 104 provided on a lower surface of the quick return mirror 101, and is led to a focal point sensor 300, which is a CCD disposed under the quick return mirror 101.

Circuits provided in the camera body 100 are controlled by a camera control circuit (CPU) 110, which comprises a micro-computer. The camera control circuit 110 is connected to a peripheral circuit 120. The photometry IC 103, a motor drive circuit 121, an exposure mechanism 122 and an aperture mechanism 123 are directly connected to the peripheral circuit 120. The motor drive circuit 121 drives a mirror motor 124, which changes an inclination angle of the quick return mirror 101, and a winding motor 125, which winds a film (not shown). The exposure mechanism 122 operates a shutter (not shown) and adjusts an opening degree of an aperture (not shown).

Another motor drive circuit 130, which is connected to the camera control circuit 110, drives an AF motor 131, to which a gear block 132 is connected. The gear block 132 is coupled to a gear block 203, which is disposed in the interchangeable lens 200, through a joint mechanism (not shown). Due to the gear block 203, the focusing lens groups 201 and 202 can be moved along an optical axis thereof, so that a focus condition of the object to be photographed is adjusted. On the other hand, an encoder 133 is connected to an output shaft of the AF motor 131, and pulse signals output from the encoder 133 are counted by a counter 111 provided in the camera control circuit 110, so that an amount of displacement of the lens is obtained.

A D/A converter 126 is provided in the peripheral circuit 120, and an AGC level signal (Vagc) is input to the focal point sensor 300 via the D/A converter 126, so that an output amplitude of a video signal (VIDEO) of the focal point sensor 300 is determined. The video signal output from the focal point sensor 300 is input to an A/D converter 112 in the camera control circuit 110, so that the video signal is used for controlling the focusing lens groups 201 and 202 to perform an automatic focusing.

An automatic/manual focusing switch 141, a release switch 142, a photometry switch 143, a main switch 144 and a focus limit switch 147 which is an electrical switch, are connected to the camera control circuit 110. The automatic/manual focusing switch 141 is provided for setting a focusing adjustment in one of an automatic control or a manual control. The release switch 142 is turned ON when fully depressing a shutter button (not shown), so that a photographing operation is performed. The photometry switch 143 is turned ON when partly depressing the shutter button, so that all of the circuits in the camera body 100, including the focal point sensor 300, are activated. The main switch 144 is used for permitting operations of the camera. The focus limit switch 147 is used for defining a focusing range within which the focusing lens groups 201 and 202 can be moved.

A display device 145 and a non-volatile memory (EEPROM) 146 are connected to the camera control circuit 110. The display device 145 is provided for indicating a photographing mode, a shutter speed and so on. Data regarding the focusing range is stored in the EEPROM 146.

In the interchangeable lens 200, a lens control circuit (lens CPU) 204 is provided to transfer information, which is inherent to the interchangeable lens, between the camera body 100 and the interchangeable lens 200 so that an automatic focusing (AF) adjustment is carried out. A focus limit switch (i.e., an electrical switch) 211 and a distance switch 212 are also connected to the lens control circuit 204. The focus limit switch 211 is provided for determining the focusing range, similarly to the focus limit switch 147 which is provided in the camera body 100. The distance switch 212 is provided for sensing the positions of the focusing lens groups 201 and 202, and is formed by a code plate 251 and a brush 252, as described later with reference to FIG. 3.

Figure 2:
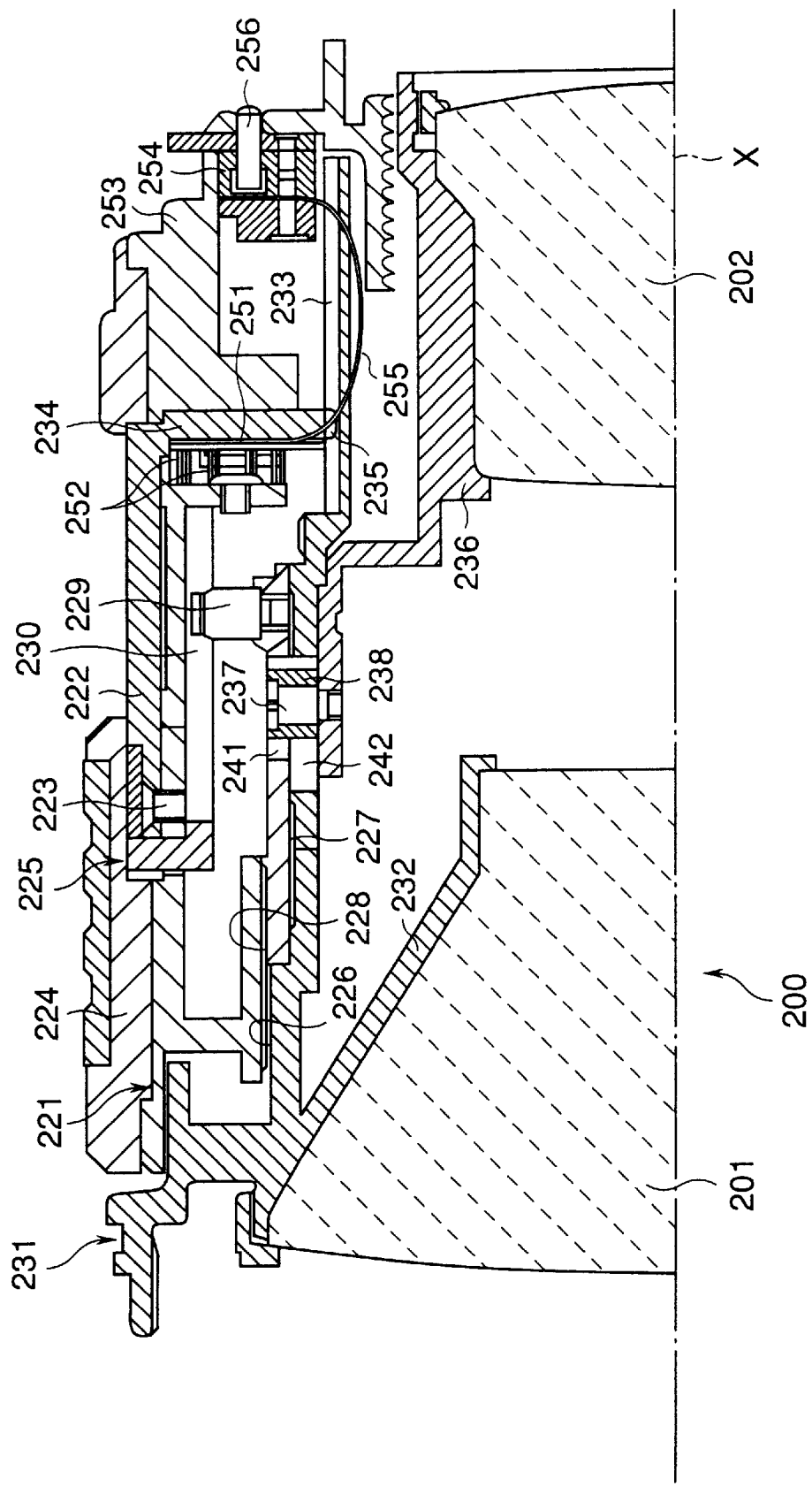
FIG. 2 is a sectional view showing an interchangeable lens.

FIG. 2 shows a construction of the interchangeable lens 200.

The lens barrel of the interchangeable lens 200 has a first support cylinder 221 and a second support cylinder 222, which are integrally connected to each other through a screw 223. A manual operation ring 224 is rotatably fitted on outer surfaces of the support cylinders 221 and 222, and is integrally connected to a rotational cylinder 225, which is rotatably supported by an inner surface of the second support cylinder 222. Namely, the manual operation ring 224 and the rotational cylinder 225 are rotatable relative to the support cylinders 221 and 222, about an optical axis X. Note that the rotational cylinder 225 is connected to the gear block 203 (see FIG. 1). Therefore, when the AF motor 131 rotates, the rotational cylinder 225 is rotated through the gear block 203.

A helicoid 226 is formed on an inner surface of the first support cylinder 221, and is meshed with a helicoid 228 formed on an outer surface of a cam ring 227. An engaging pin 229 is fixed on the cam ring 227, and is engaged with a guide groove 230 formed on the rotational cylinder 225. The guide groove 230 linearly extends in parallel to the optical axis X.

Accordingly, when the AF motor 131 or the manual operation ring 224 is rotated, the rotational cylinder 225 is rotated, so that the engaging pin 229 is pressed by a side wall of the guide groove 230, and thus, the cam ring 227 is rotated about the optical axis X. Further, since the cam ring 227 and the first support cylinder 221 are connected to each other through the helicoids 226 and 228, the cam ring 227 is displaced along the optical axis X. Namely, due to the rotation of the AF motor 131 or the manual operation ring 224, the cam ring 227 is displaced along the optical axis X while rotating about the optical axis X.

A first lens holding cylinder 231 extends over approximately a whole length of the interchangeable lens 200. An inner side of the first lens holding cylinder 231 is formed with a holding portion 232, to which the first focusing lens group 201 is attached. A linear guide groove 233, extending along the optical axis X, is formed on an outer surface of a rear portion of the first lens holding cylinder 231. A rear end portion of the second support cylinder 222 is provided with an annular wall 234 having a projection 235 on an inner periphery thereof. The projection 235 is engaged with the linear guide groove 233. Therefore, the first lens holding cylinder 231 is not rotated about the optical axis X, but is linearly moved along the optical axis X.

The first lens holding cylinder 231 is inserted in the cam ring 227. The cam ring 227 slidably contacts an outer surface of the first lens holding cylinder 231, and is rotatable about the optical axis X. The first lens holding cylinder 231 and the cam ring 227 are moved along the optical axis X as one body. Therefore, when the AF motor 131 or the manual operation ring 224 is rotated, the cam ring 227 is moved along the optical axis X while rotating about the optical axis X, and the first focusing lens group 201 is displaced along the optical axis X.

A second lens holding cylinder 236, to which the second focusing lens group 202 is attached, is provided in the first lens holding cylinder 231. A pin 237 is fixed on the second lens holding cylinder 236, and a cam follower 238 is provided on an outer surface of the pin 237. An arched cam hole 241, which is formed in the cam ring 227 and extends in an arcuate direction, is superposed on a linear cam hole 242, which is formed in the first lens holding cylinder 231 and extends in the axial direction, and the pin 237 is engaged with the cam holes 241 and 242. The arched cam hole 241 lies on a theoretical helix formed on a circumferential surface of the cam ring 227, and the linear cam hole 242 extends in parallel to the optical axis X.

Accordingly, when the AF motor 131 or the manual operation ring 224 is rotated, the cam ring 227 is moved along the optical axis X while rotating about the optical axis X, so that the first focusing lens group 201 is moved along the optical axis X, and at the same time, the cam follower 238, the second lens holding cylinder 231 and the second focusing lens group 202 are moved along the optical axis X. Thus, a focusing adjustment is performed.

The code plate 251 is provided on the annular wall 234 to generate a signal regarding positions of the focusing lens groups 201 and 202 on the optical axis X. The code plate 251 extends in a circular direction around the optical axis X, similarly to the annular wall 234, and the brush 252, attached to the rotational cylinder 225, slidably contacts a surface of the code plate 251.

A mount 253 for attaching the interchangeable lens 200 to the camera body 100 is provided on a rear side of the annular wall 234. A terminal member 254 is attached to the mount 253, and the terminal member 254 and the code plate 251 are electrically connected to each other through a flexible printed wiring board 255. Lens contact pins 256 are provided on the mount 253, and are in contact with the terminal member 254. The lens contact pins 256 can abut camera body contact pins (not shown) provided on a mount (not shown) of the camera body 100, and thus, a data communication is performable between the interchangeable lens 200 and the camera body 100.

Figure 3:
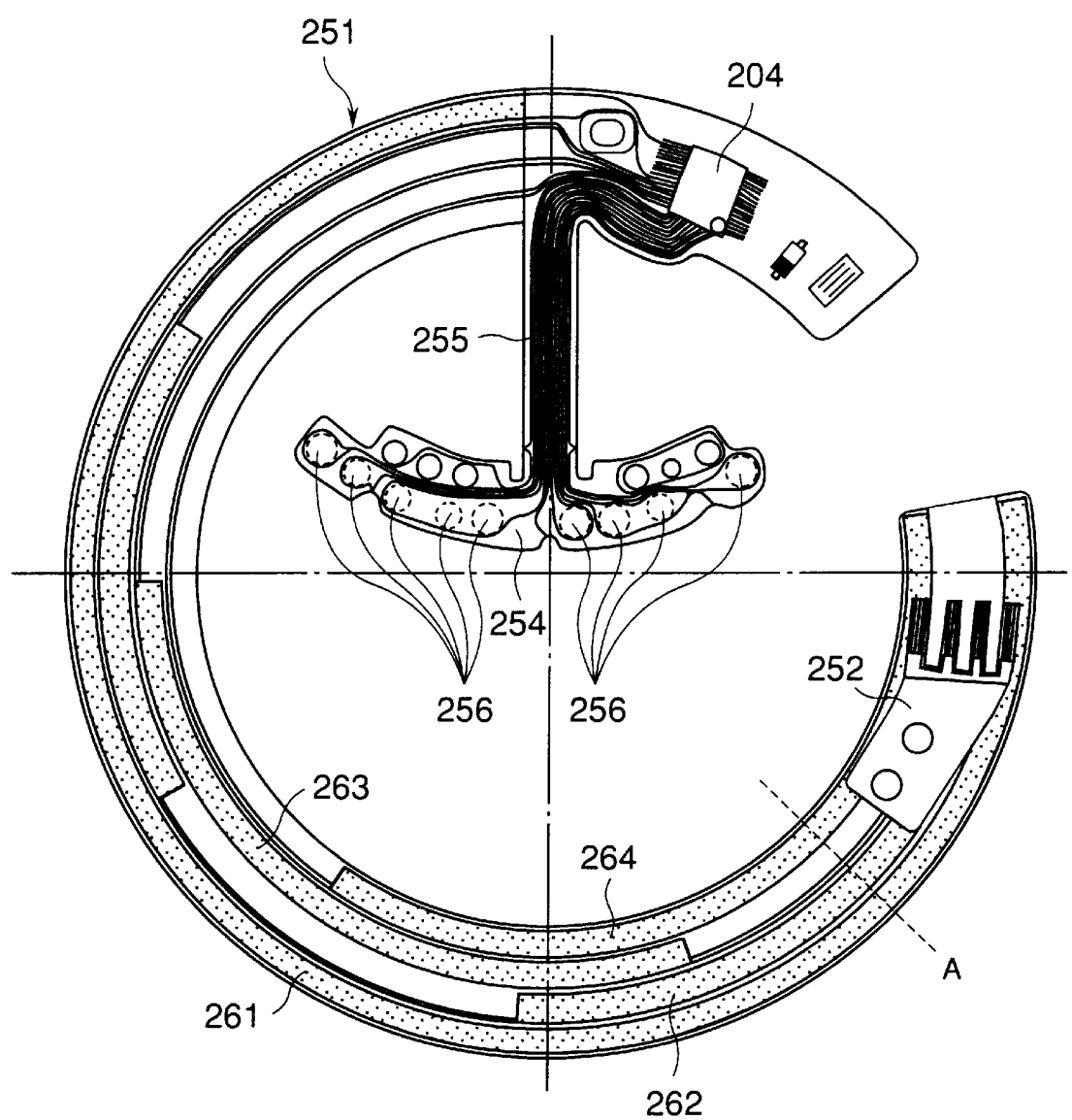
FIG. 3 is a plan view showing a code plate, a terminal member and a flexible printed wiring board.

FIG. 3 shows a lens position sensing system, having the code plate 251, the terminal member 254, the flexible printed wiring board 255 and the brush 252. Conductive patterns 261, 262, 263 and 264, extending along circular directions, are formed on a surface of the code plate 251. The brush 252 slidably contacts the conductive patterns 261 through 264, and is moved in accordance with axial positions of the focusing lens groups 201 and 202, so that distance information Dv' (described later) corresponding to positions of the focusing lens groups 201 and 202 is sensed.

The first conductive pattern 261, outermostly formed and extending over approximately 270 degrees, is grounded. The second conductive pattern 262, which is positioned adjacent to and parallel with an inner side of the first conductive pattern 261, corresponds to a least significant bit of a signal indicating the distance information. The third conductive pattern 263, which is positioned adjacent to and parallel with an inner side of the second conductive pattern 262, corresponds to a second bit of the signal. The fourth conductive pattern 264, which is innermostly positioned, corresponds to a third bit of the signal.

When the brush 252 is in contact with a conductive pattern (261 to 264), the bit corresponding to the conductive pattern is 0, and when the brush 252 is not in contact with a conductive pattern (261 to 264), the bit corresponding to the conductive pattern is 1. For example, when the brush 252 is located at a position indicated by reference "A", a signal "010" is generated by the code plate 251.

The lens control circuit 204 is provided on the code plate 251. An f-number corresponding to the maximum aperture, a minimum f-number and a focal length, which are inherent to the interchangeable lens 200, are stored in a memory provided in the lens control circuit 204.

Figure 4:
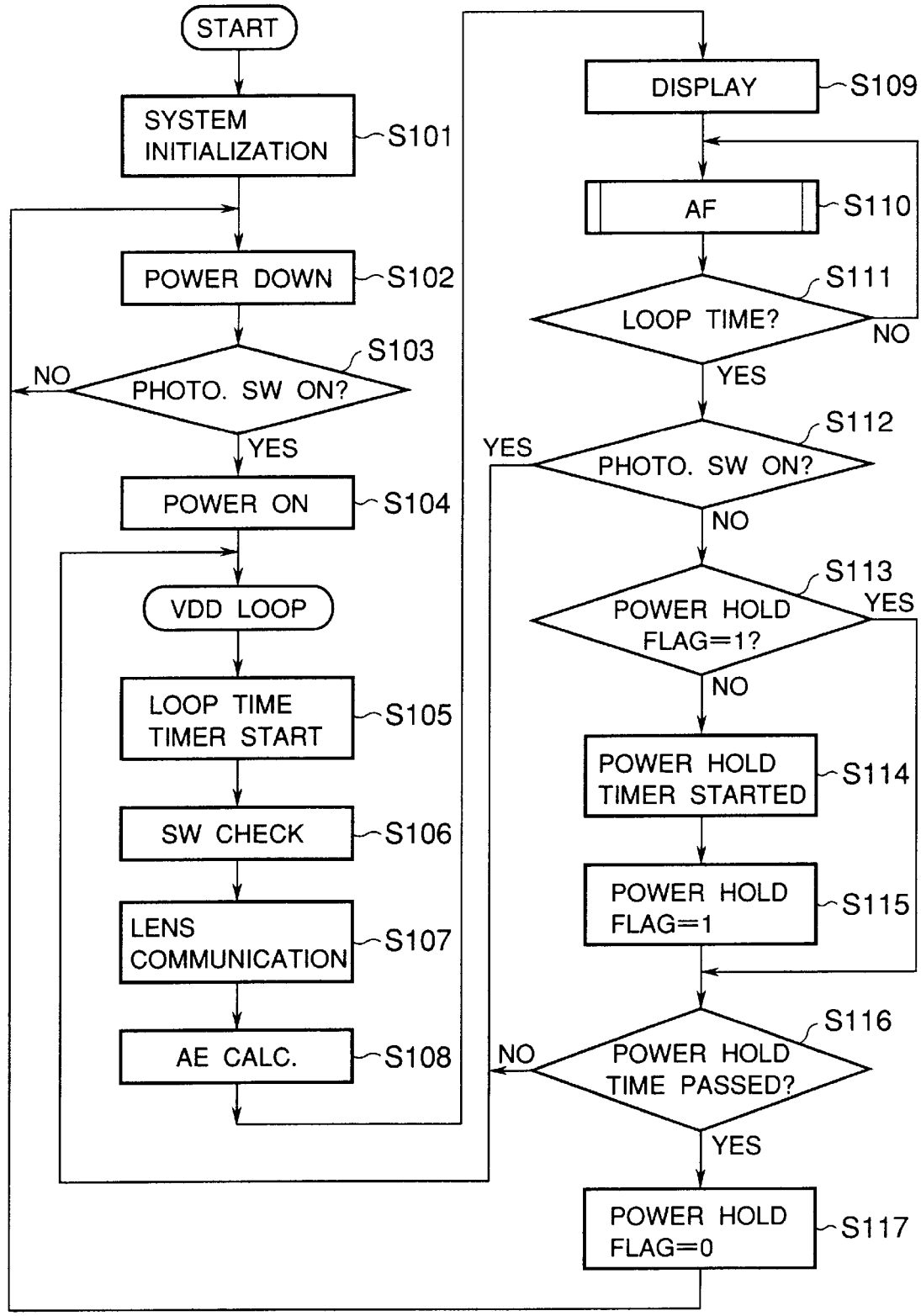
FIG. 4 is a flowchart of a main routine controlling an operation of the camera.

FIG. 4 is a flowchart of a main routine controlling an operation of the camera. The main routine is executed in the camera control circuit 110, and is started by turning ON the main switch 144 (FIG. 1).

In Step S101, a system initialization is executed, in which various kinds of parameters regarding an operation control of the camera are initialized. In Step S102, a power down process is performed to limit a power consumption of a battery. In Step S103, it is determined whether the photometry switch 143 (FIG. 1) is turned ON. When the photometry switch 143 is not turned ON, the process goes back to Step S102, and when the photometry switch 143 is turned ON, the process goes to Step S104, in which electric power is supplied to electric circuits provided in the camera body 100 (FIG. 1) and the interchangeable lens 200 (FIG. 1). Namely, by turning ON the photometry switch 143, each of the circuits is activated.

Then, a VDD loop composed of Steps S105 through S117 is executed. In Step S105, a timer for measuring a loop time is started. The loop time is a time for which an AF (automatic focusing) process should be carried out, and is checked in Step S111, described later.

In Step S106, a state of each of the switches is checked. In Step S107, a lens communication is performed, in which a predetermined data is transmitted between the camera body 100 and the interchangeable lens 200. In Step S108, an AE (automatic exposure) calculation is carried out, so that a shutter speed and an aperture value is obtained. In Step S109, a display process is performed, in which the shutter speed and the aperture value are indicated by the display device 145.

Figure 5A:
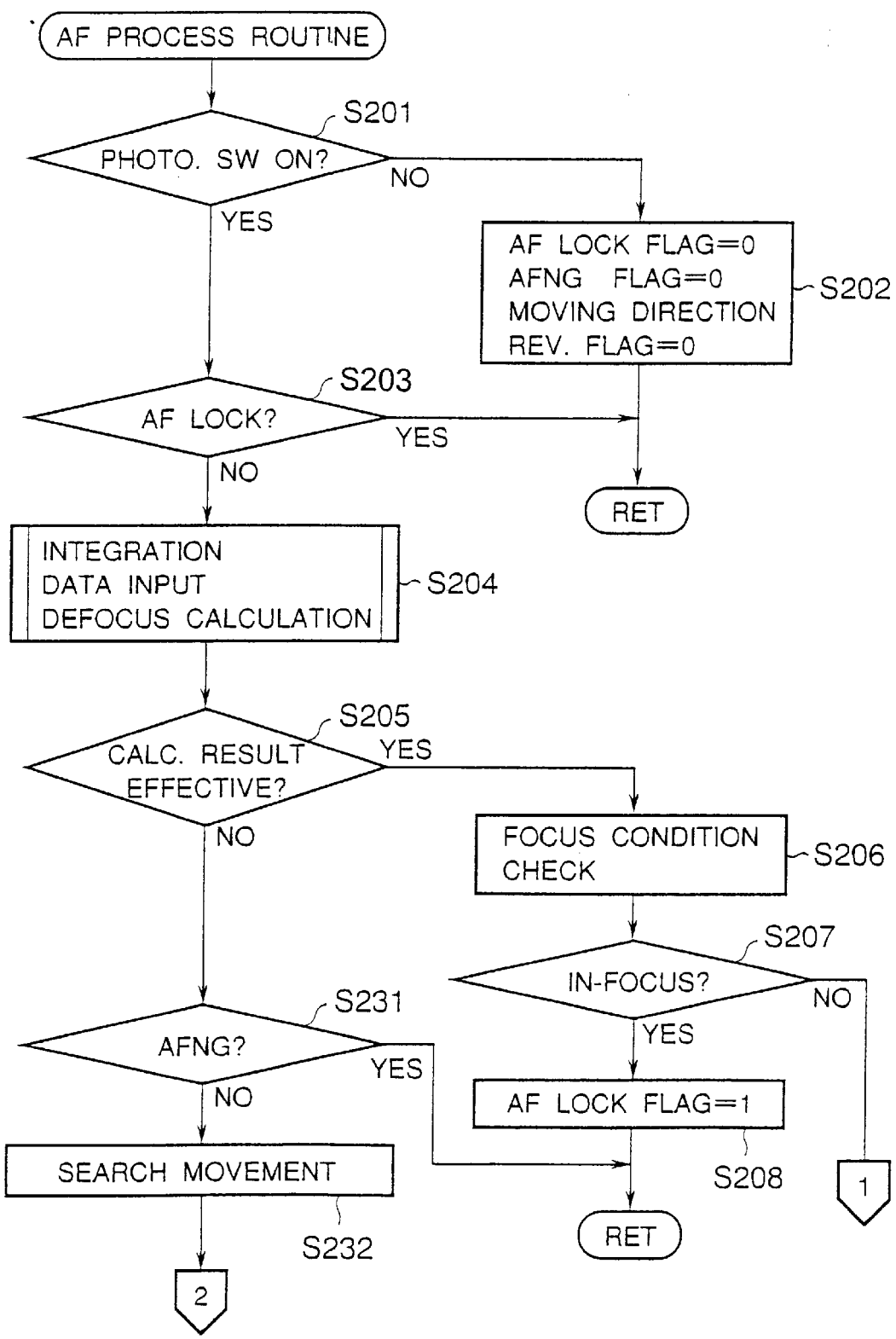
FIGS. 5A, 5B and 5C show a flowchart of an AF process routine executed in Step S110 shown in FIG. 4.

In Step S110, a sub-routine of an AF process (FIGS. 5A, 5B and 5C) is executed, so that the automatic focusing process is performed. In Step S111, it is determined whether the loop time has passed since the timer was started in Step S105. When the loop time has not passed, Step S110 is executed again. Conversely, when the loop time has passed, Step S112 is executed in which it is determined whether the photometry switch 143 is turned ON. When the photometry switch 143 is kept ON, the process goes back to Step S105, and the process described above is again executed. Namely, the AF process is continuously carried out until the loop time passes, and when the loop time has passed, a photometry operation is newly carried out if the photometry switch 143 is turned ON, so that the shutter speed and the aperture value are renewed.

When it is determined in Step S112 that the photometry switch 143 is not turned ON, i.e, when the shutter button is released, Step S113 and Steps following Step S113 are executed.

In Step S113, it is determined whether a power hold flag is 1. The initial value of the power hold flag is set to 0 in Step S101. Therefore, when Step S113 is executed for the first time, the process goes from Step S113 to Step S114, in which the power hold timer is started, and then in Step S115, the power hold flag is set to 1.

In Step S116, it is determined whether a power hold time has passed, i.e., whether a predetermined time has passed since the power hold timer was started in Step S114. When Step S116 is executed for the first time, the process goes back to Step S105, since the power hold time has yet to pass. Then, Steps S105 through S112 are executed, and when the photometry switch 143 is turned OFF, the process goes from Step S112 to Step S113. At this time, since it is determined in Step S113 that the power hold flag is 1, Steps S114 and S115 are skipped, and Step S116 is executed. During such a process, when the power hold time has passed, the power hold flag is reset to 0 in Step S117, and then the process goes back to Step S102.

Thus, when the predetermined time has passed after the photometry switch 143 is switched to an OFF state, the power down process is carried out, so that an electric power consumption is restricted or restrained.

With reference to FIGS. 5A, 5B and 5C, and FIG. 1, the AF process routine executed in Step S110 shown in FIG. 4 is described.

In Step S201, it is determined whether the photometry switch 143 is turned ON. When the AF process routine is executed, the photometry switch 143 is usually set to an ON state, and if the photometry switch 143 is set to an OFF state, Step S202 is executed. Namely, an AF lock flag, an AFNG flag and a moving direction reverse flag are reset to 0, respectively, and the AF process routine ends.

When it is determined in Step S201 that the photometry switch 143 is turned ON, Step S203 is executed in which it is determined whether the AF lock flag is 1. The AF lock flag is set to 1 in Step S208 when the photographing lens (i.e., the interchangeable lens 200) is set to an in-focus condition, and in this case, the AF process routine ends. Conversely, when the AF lock flag is not 1, Step S204 and Steps following Step S204 are executed so that a focusing adjustment is carried out.

In Step S204, an accumulation or integration of electric charge is performed in the focal point sensor 300, and a video signal (VIDEO, FIG. 1) generated due to the accumulation is input to the camera control circuit 110. Then, based on the video signal, a defocus calculation is performed to obtain a defocus amount. In Step S205, it is determined whether a calculation result obtained in Step S204 is effective, i.e., whether an in-focus position of the photographing lens has been obtained. When the calculation result is effective, Step S206 and Steps following Step S206 are executed, so that a focusing adjustment is performed.

In Step S206, the defocus amount, which is obtained by a calculation in Step S204, is compared with a predetermined range. In Step S207, it is determined whether the defocus amount is within the predetermined range. When the defocus amount is within the predetermined range, it is deemed that the focusing lens groups 201 and 202 are set to in-focus condition, and thus, Step S208 is executed in which the AF lock flag is set to 1, and the AF process routine ends. Conversely, when it is determined in Step S207 that the defocus amount is beyond the predetermined range, Step S211 is executed.

In Step S211, it is determined whether a rotational direction of a gear provided in the gear block 203, by which the focusing lens groups 201 and 202 are moved, is reversed from a previous direction. When the rotational direction is reversed, Steps S212 and S213 are executed so that an error generated, due to a backlash which occurs when the gear of the gear block 203 is reversed, is removed. In Step S212, a backlash calculation is performed, so that a backlash removal amount, i.e., a rotational amount compensating the backlash, is obtained. In Step S213, the gear is rotated by the backlash removal amount obtained in Step S212.

Conversely, when it is determined in Step S211 that the rotational direction is the same as the previous direction, Step S214 is executed, in which it is determined whether the AFNG flag is 1. The AFNG flag is set to 1 in Step S226 (FIG. 5C), when the focusing lens groups 201 and 202 have reached a limit position of the range within which the focusing lens groups 201 and 202 can be moved, for example. In this case, a focusing adjustment can not be carried out, and the AF process routine ends. Conversely, when the AFNG flag is 0, Steps S212 and S213 are skipped.

After the execution of Step S213 or S214, Step S215 is executed in which a pulse calculation is performed. Namely, a number of pulses, which is output from the encoder 133 when the focusing lens groups 201 and 202 are moved by the defocus amount obtained in Step S204, is obtained. In Step S216, the AF motor 131 is driven, so that the focusing lens groups 201 and 202 start to be move.

In Step S217, an overlap integration is performed. Namely, while the focusing lens groups 201 and 202 are moved, an accumulation of electric charge is carried out in the focal point sensor 300, and based on a video signal generated due to the accumulation, a defocus calculation is carried out, similarly to Step S204, and a defocus amount is obtained. In Step S218, it is determined whether the calculation result of Step S217 was effective, in a similar way as in Step S205. When the calculation result is effective, Step S219 is executed in which the pulse calculation is performed similarly to Step S215, and when the calculation is not effective, Step S219 is skipped. A state, in which the calculation result is not effective, occurs when a contrast of an object to be photographed abruptly lowers, for example.

Figure 6:
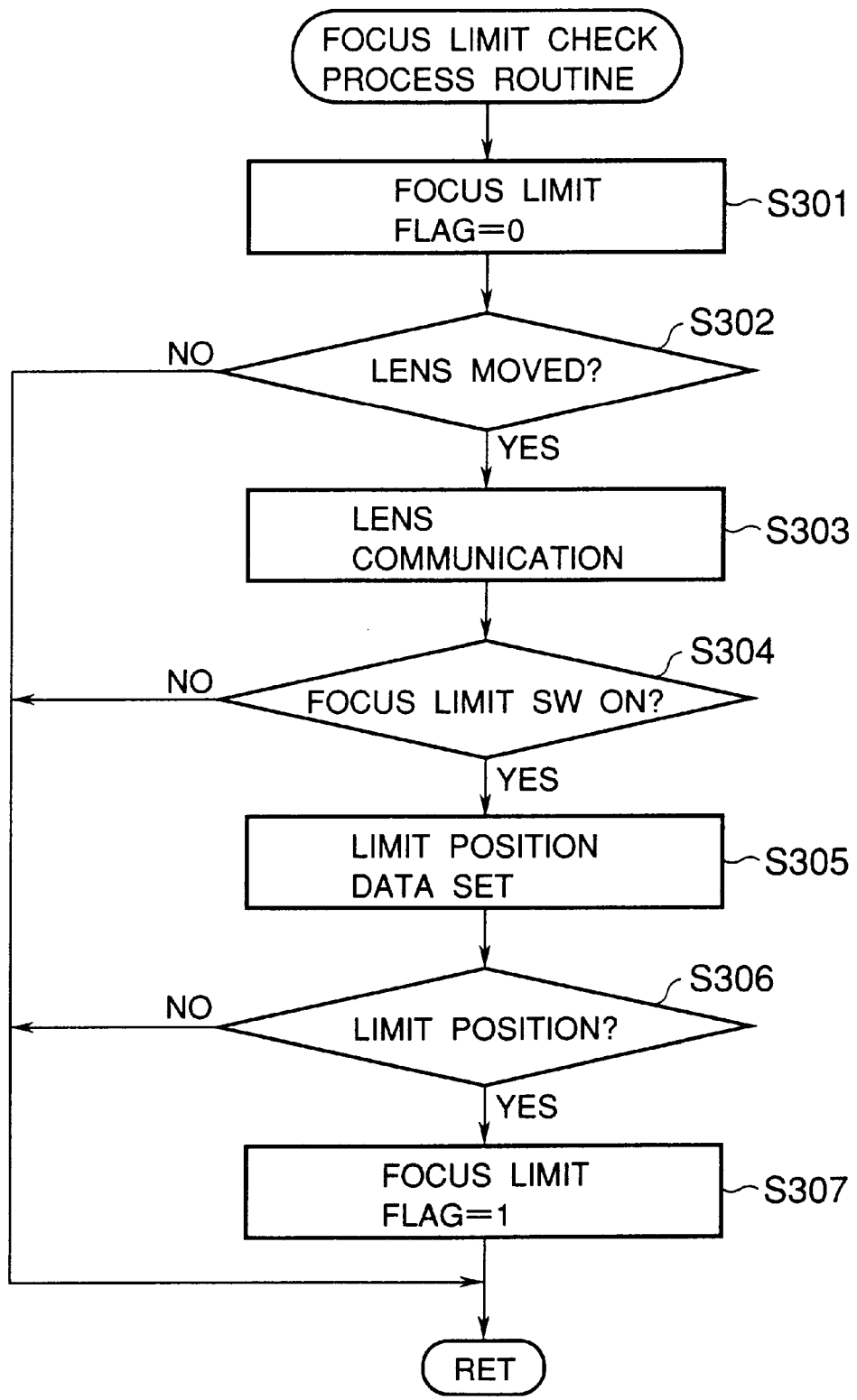
FIG. 6 shows a flowchart of a focus limit check process routine of a first embodiment.

Then, in Step S221, a focus limit check process routine, shown in FIG. 6, is executed so that a focus limit check process is carried out. Namely, it is determined whether the focusing lens groups 201 and 202 are located at the limit position of the range within which the focusing lens groups 201 and 202 can be moved. When the focusing lens groups 201 and 202 are located at the limit position, the focus limit flag is set to 1, and when the focusing lens groups 201 and 202 are not located at the limit position, the focus limit flag is set to 0.

In Step S222, it is determined whether the focus limit flag is 1. When the focus limit flag is 0, it is determined in Step S223 whether the focusing lens groups 201 and 202 are located at an infinity end position (or a far end position) or a near end position being boundaries for a maximum focusing range. The sensing of the end positions is carried out by determining whether a pulse signal is output from the encoder 133. When it is determined that the pulse signal is not output, it is deemed that the focusing lens groups 201 and 202 are located at the infinity end position or the near end position.

When it is determined in Steps S222 and S223 that the focus limit flag is 0 and the focusing lens groups 201 and 202 are not located at the infinity end position nor the near end position, Step S224 is executed in which it is determined whether the movements of the focusing lens groups 201 and 202 have been completed. Namely, in Step S224, it is determined whether the focusing lens groups 201 and 202 have been moved by the number of pulses obtained in Step S219. When the movements of the focusing lens groups 201 and 202 have not been completed, the process goes back to Step S217, so that the operations described above are performed again, and when the movements have been completed, the AF process routine ends.

When it is determined in Step S222 or S223 that the focus limit flag is 1 or the focusing lens groups 201 and 202 are located at the infinity end position or the near end position, Step S225 is executed in which the AF motor 131 is stopped so that the movements of the focusing lens groups 201 and 202 are stopped. Then, in Step S226, the AFNG flag, which indicates that a focusing adjustment is impossible, is set to 1, and the AF process routine ends.

On the other hand, when it is determined in Step S205 that the calculation result is not effective, Step S231 and Steps following Step S231 are executed, so that the focusing lens groups 201 and 202 are moved to obtain an in-focus position. First, in Step S231, it is determined whether the AFNG flag is 1. When the AFNG flag is 1, the AF process routine ends, and when the AFNG flag is 0, Step S232 is executed in which a lens movement (i.e., a search movement) is started. Namely, the focusing lens groups 201 and 202 are moved toward the near end position from the present position.

In Step S233, a search integration is carried out, the contents of which are the same as those executed in Step S217. Namely, while the focusing lens groups 201 and 202 are moved, a video signal is generated by the focal point sensor 300, and in a similar way as Step S204, a defocus calculation is performed to obtain a defocus amount. In Step S234, it is determined whether the calculation result of Step S233 is effective. When the calculation result is effective, the process goes to Step S219.

When it is determined in Step S234 that the calculation result is not effective, Step S235 is executed, in which the focus limit check process routine is carried out in a similar way as in Step S221. When it is determined in Step S236 that the focus limit flag is not 1, and in Step S237 that the focusing lens groups 201 and 202 are not located at the end positions (infinity or near), the process goes back to Step S233. Namely, the search integration is repeatedly carried out so far as the focusing lens groups 201 and 202 are located in a range within which the lens groups 201 and 202 can be moved.

During the search integration, when it is determined that the focus limit flag is 1, or that the focusing lens groups 201 and 202 have reached either end position (infinity or near), Step S238 is executed in which it is determined whether the moving direction reverse flag is 1. The moving direction reverse flag is set to 1, when the moving directions of the focusing lens groups 201 and 202 are reversed. When Step S238 is executed for the first time, the moving direction reverse flag is 0. Therefore, Step S239 is executed in which the moving direction reverse flag is set to 1, and Step S240 is executed in which the moving directions of the focusing lens groups 201 and 202 are reversed. Namely, the focusing lens groups 201 and 202 are started to be moved toward the infinity end position, and Step S233 is again executed.

During the execution of the loop composed of Steps S233 through S240, when it is determined in Step S234 that the calculation result is effective, the process goes to Step S219. When the process goes from Step S236 or Step S237 to Step S238, it is determined that the moving direction reverse flag is 1, and therefore, Step S225 is executed in which the AF motor 131 is stopped, and then, in Step S226, the AFNG flag is set to 1, and the AF process routine ends.

Thus, in the search movement, the focusing lens groups 201 and 202 are moved in the range, within which the lens groups 201 and 202 are moveable, in such a manner that the focusing lens groups 201 and 202 cover a whole of the range, and during which the in-focus point is sensed. Note that the range is the focusing range when set by the focus limit check process routine shown in FIG. 6, and is the maximum focusing range when the focusing range is not set.

Figure 5B:
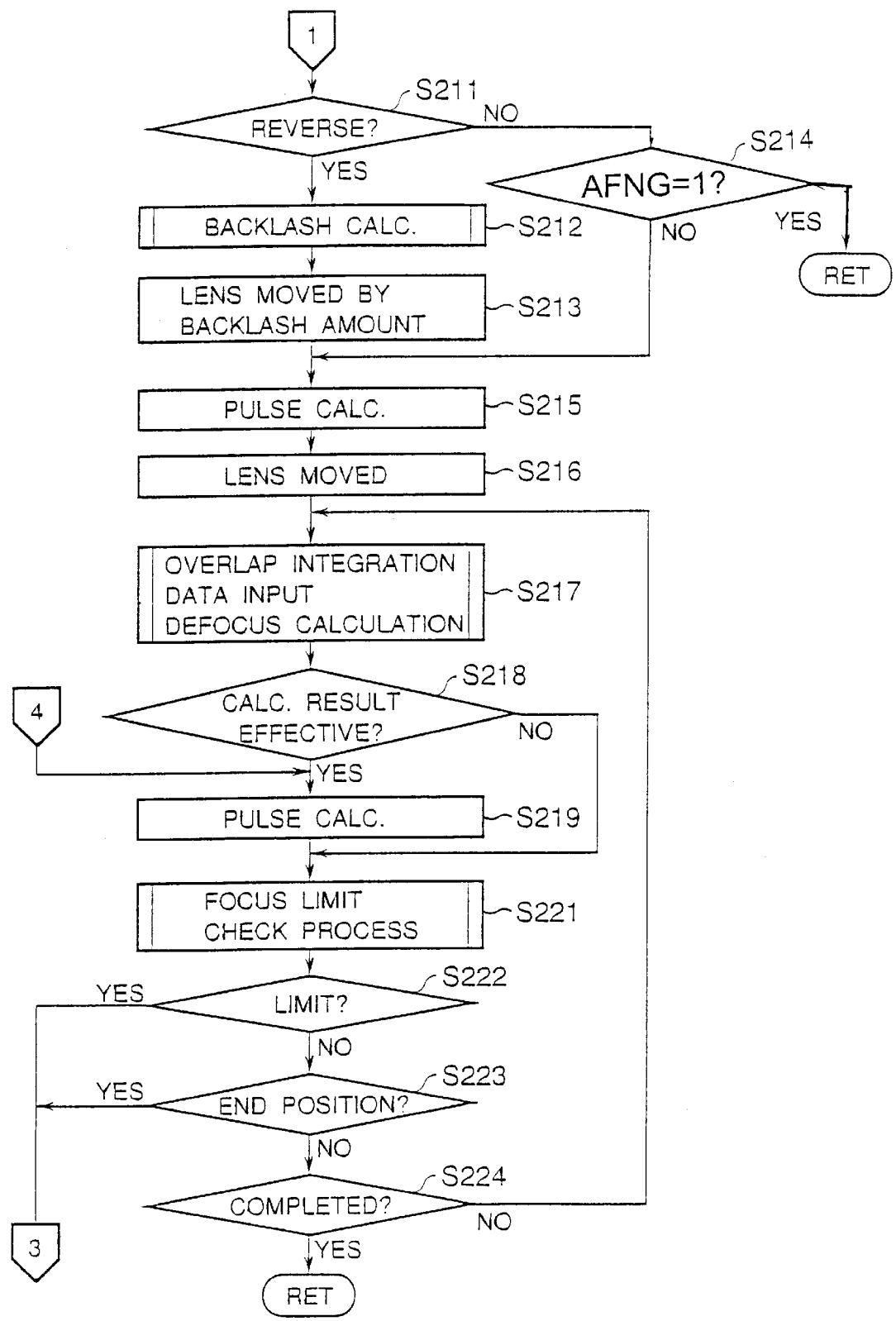
Figure 5C:
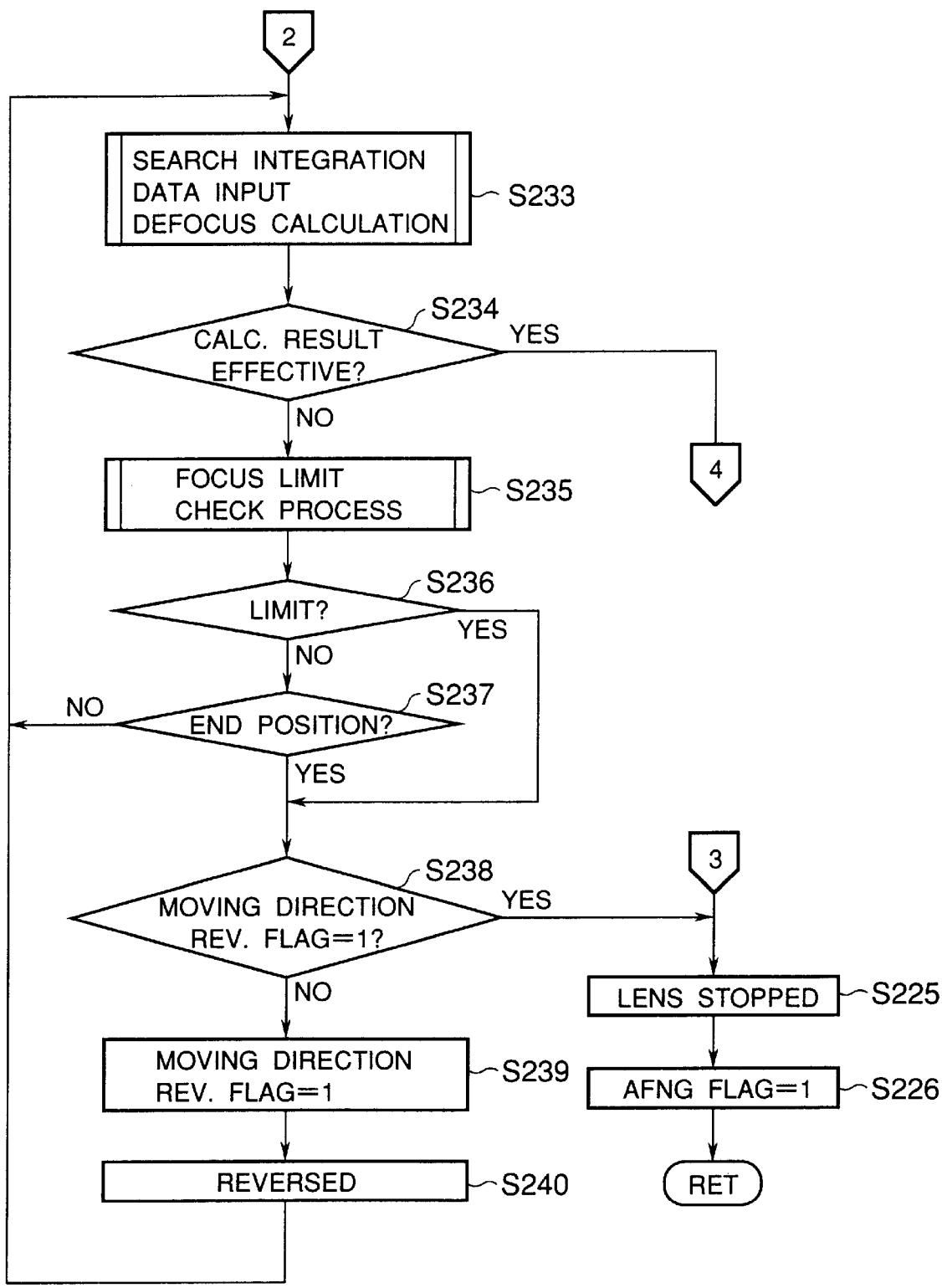

FIG. 6 shows a flowchart of the focus limit check process routine executed in Step S221 shown in FIG. 5B and Step S235 shown in FIG. 5C. With reference to FIGS. 3 and 6, the focus limit check process routine is described below.

In Step S301, a focus limit flag is reset to 0. In Step S302, it is determined whether the focusing lens groups 201 and 202 are being moved. When the focusing lens groups 201 and 202 are stopped, the focus limit check process routine ends, and when the focusing lens groups 201 and 202 are being moved, a focus limit check process is performed in Step S303 and Steps following Step S303.

In Step S303, a lens communication is carried out. Namely, a data communication is performed between the camera control circuit 110 and the lens control circuit 204 of the interchangeable lens 200, so that a distance code, indicating the present position of the focusing lens groups 201 and 202, is input to the camera control circuit 110. The distance code is determined by a contact position where the brush 252 contacts the code plate 251, i.e., a contact relationship between the brush 252 and the conductive patterns 261 through 264. For example, when the brush 252 is located at a position indicated by reference "A", the distance code is "010".

In Step S304, it is determined whether the focus limit switch 147 or 211 is turned ON, i.e., it is determined whether the focusing range is provided so that a range, within which the focusing lens groups 201 and 202 can be moved and which includes either the infinity or near end position, is restricted. When the focus limit switches 147 and 211 are turned OFF, the focus limit check process routine ends. Conversely, when the focus limit switch 147 or 211 is turned ON, Step S305 is executed.

In Step S305, a limit position data, indicating a limit position, which is a boundary of the focusing range, is read from the EEPROM 146. In Step S306, it is determined whether the present position of the focusing lens groups 201 and 202 corresponds to one of the limit position data, the present position being represented in a form of distance information Dv'. When the present position and the limit position data do not correspond to each other, Step S307 is skipped, and the focus limit check process routine ends. Conversely, when the present position and the limit position data correspond to each other, the focusing lens groups 201 and 202 are located at the limit position of the focusing range, and thus, after the focus limit flag is set to 1 in Step S307, the focus limit check process routine ends.

Table 1 shows a relationship between the distance information Dv', corresponding to the present position of the focusing lens groups 201 and 202, and the distance code. APEX value Dv of object distance is obtained by adding $Dv_{min}$, which is an inherent value of the lens, and the distance information Dv'. The relationship between the APEX value Dv and an object distance D (m) is indicated in Table 2.

TABLE 1

| Dv' | DISTANCE CODE | | |
| --- | --- | --- | --- |
|  | SW3 | SW2 | SW1 |
| 0 (SHORT DISTANCE) | 1 | 1 | 1 |
| 1 | 1 | 1 | 0 |
| 2 | 1 | 0 | 0 |
| 3 | 1 | 0 | 1 |
| 4 | 0 | 0 | 1 |
| 5 | 0 | 0 | 0 |
| 6 | 0 | 1 | 0 |
| 7 (INFINITY) | 0 | 1 | 1 |

TABLE 2

| D (m) | Dv |
| --- | --- |
| 0.5 | −2 |
| 0.7 | −1 |
| 1 | 0 |
| 1.4 | 1 |
| 2 | 2 |
| 2.8 | 3 |
| 4 | 4 |
| 5.6 | 5 |
| 8 | 6 |

$$Dv = Dv_{min} + Dv'$$

wherein $Dv_{min}$ is a value which is inherent to the lens.
$$D = 2^{(Dv/2)}$$

The distance code is indicated by an ON-OFF state of the distance switch 212 (see FIG. 1) composed of the brush 252 and the conductive patterns 261 through 264 (see FIG. 3). The distance switch 212 is composed of first, second and third switches SW1, SW2 and SW3. The first switch SW1 is formed by the conductive pattern 262, which is located at the second outermost position, and the brush 252, the second switch SW2 is formed by the conductive pattern 263, which is located at the third outermost position, and the brush 252, and the third switch SW3 is formed by the conductive pattern 264, which is located at the innermost position, and the brush 252. When the conductive patterns 262, 263 and 264 are in contact with the brush 252, the switches SW1, SW2 and SW3 are turned ON to generate respective "0" signals, and when the conductive patterns 262, 263 and 264 are not in contact with the brush 252, the switches SW1, SW2 and SW3 are turned OFF to generate respective "1" signals. The first, second the third switches SW1, SW2 and SW3 correspond to the least significant bit signal, the second bit signal and the third bit signal, respectively.

Limit position data are stored in the EEPROM 146, provided in the camera body 100. The limit position data has a value included in the distance information Dv', indicated in Table 1, and when the limit position data is "4", for example, the focus limit flag is set to 1 in Step S306 of FIG. 6 if the distance code, indicating the present position of the focusing lens groups 201 and 202, is "001". The limit position data is recorded in the EEPROM 146. Although, the limit position data usually cannot be changed by a user, it may be constructed to be changed by a user by operating a predetermined switch.

As described above, in the embodiment, by using the focus limit switch 147 or 211 to electrically determine a limit position (distance information Dv'=4) between the near end position and the infinity end position, the limit position is obtained. Thus, the focusing lens groups 201 and 202 can be set to move only in a first focusing range between the near end position and the limit position, or a second focusing range between the limit position and the infinity end position. In this case, the focusing range is the first or second focusing range, in which the focusing lens groups 201 and 202 are located when the focus limit switch 147 or 211 is operated. Thus, by setting the focusing range, a range in which the focusing lens groups 201 and 202 can be moved, is restricted, so that the focusing lens groups 201 and 202 are prevented from moving over an unnecessary range, and thus, the focusing adjustment can be carried out swiftly. When the focusing range is not set, the focusing lens groups 201 and 202 can be moved beyond the first or second focusing range, and thus, the focusing adjustment is performed in a maximum focusing range between the near end position and the infinity end position.

Further, in the embodiment, the distance information, regarding the focusing lens groups 201 and 202, is electrically sensed through the code plate 251 and the brush 252, and is used as a distance correction performed in an AE (automatic exposure) calculation. Therefore, according to the embodiment, in comparison with a conventional construction in which a range, within which the focusing lens groups 201 and 202 can be moved, is mechanically restricted, a number of parts can be reduced to limit the manufacturing cost.

Note that, in the embodiment, the focus limit switch 147 is provided in the camera body 100 and the focus limit switch 211 is provided in the interchangeable lens 200. Namely, although the focusing range can be set by operating either one of the focus limit switches 147 or 211, a focus limit switch may only provided on either the camera body 100 or the interchangeable lens 200.

Figure 7A:
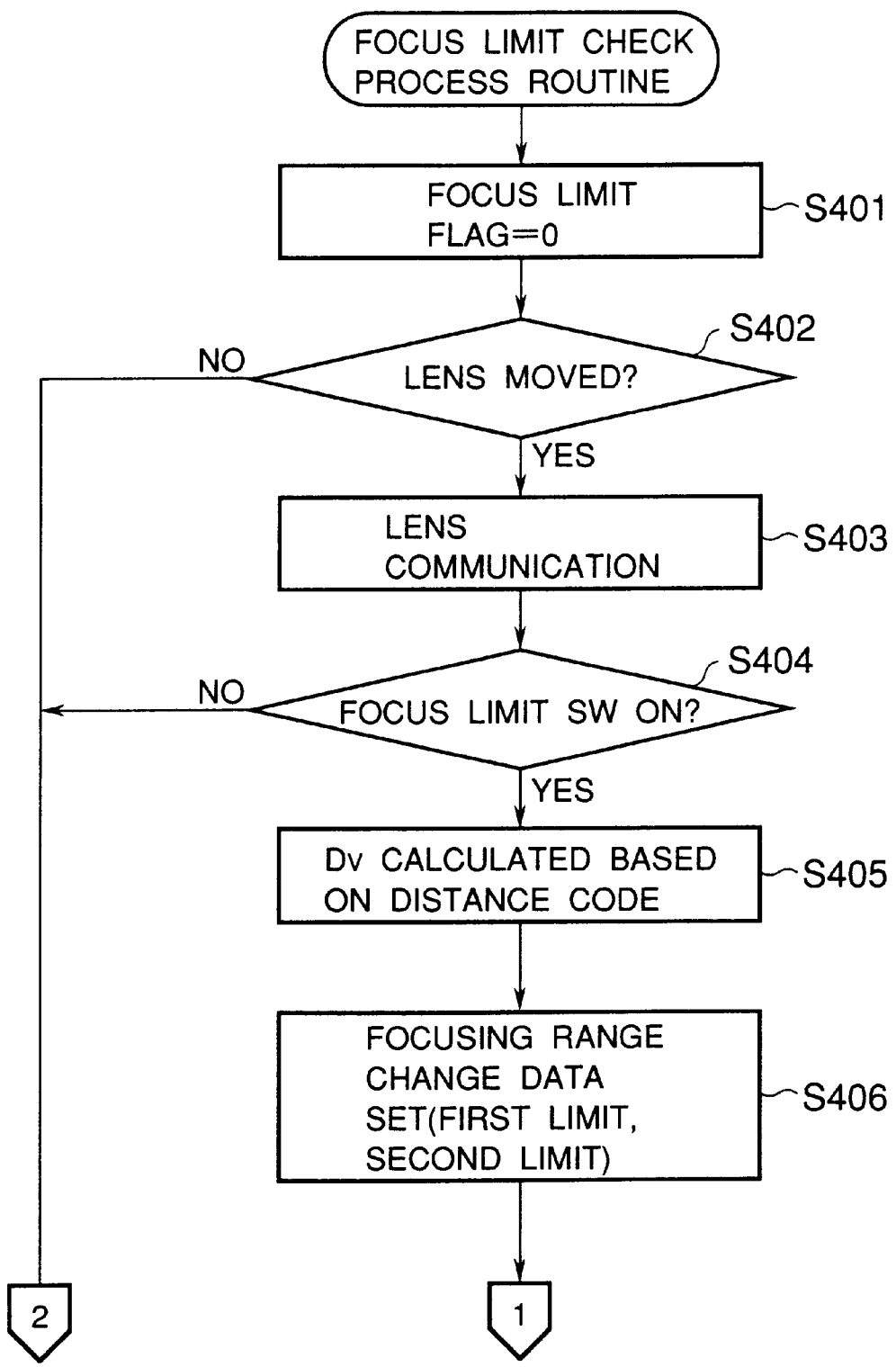
FIGS. 7A and 7B show a flowchart of a focus limit check process routine of a second embodiment.
Figure 7B:
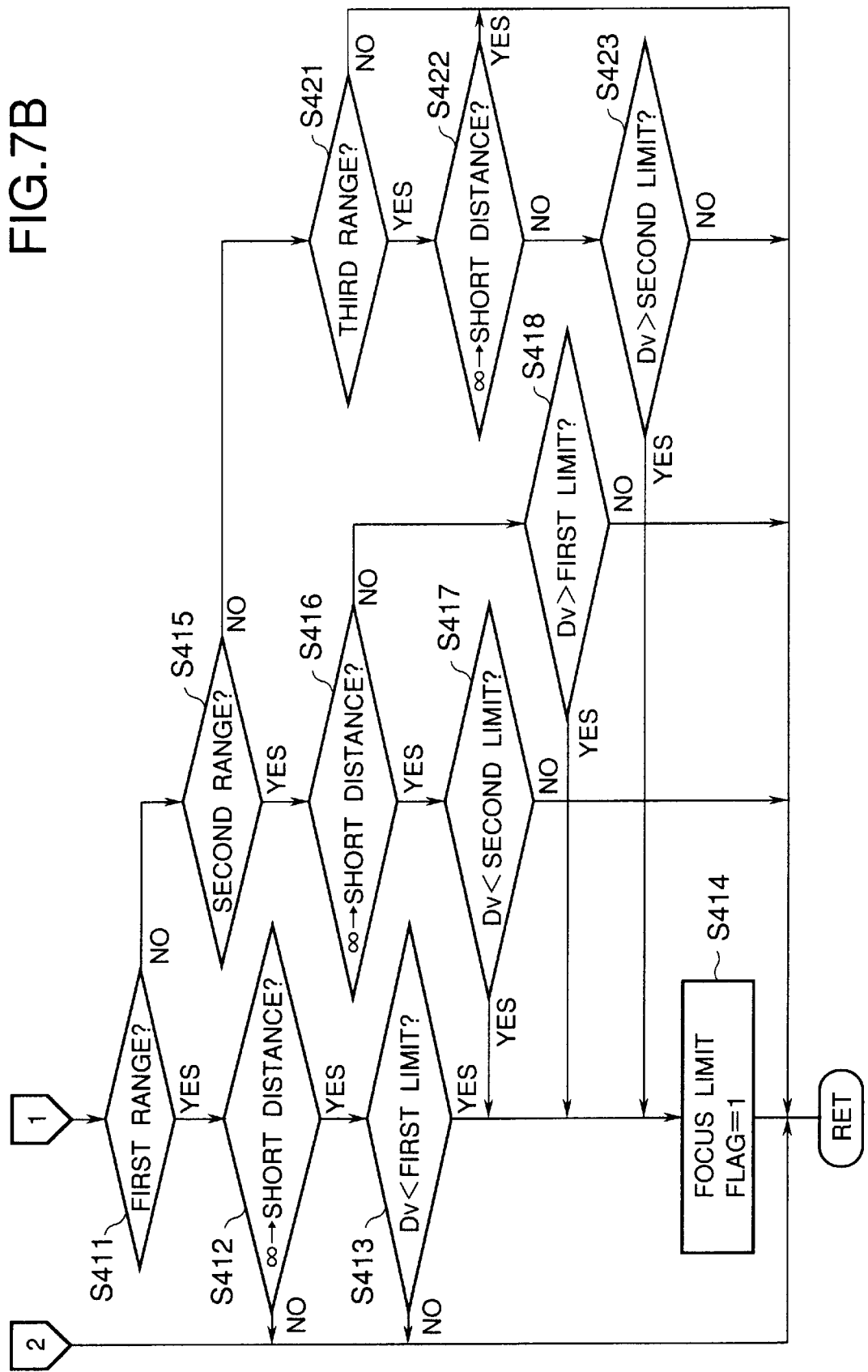

FIGS. 7A and 7B show a flowchart of a focus limit check process routine of a second embodiment of the present invention.

Figure 8:
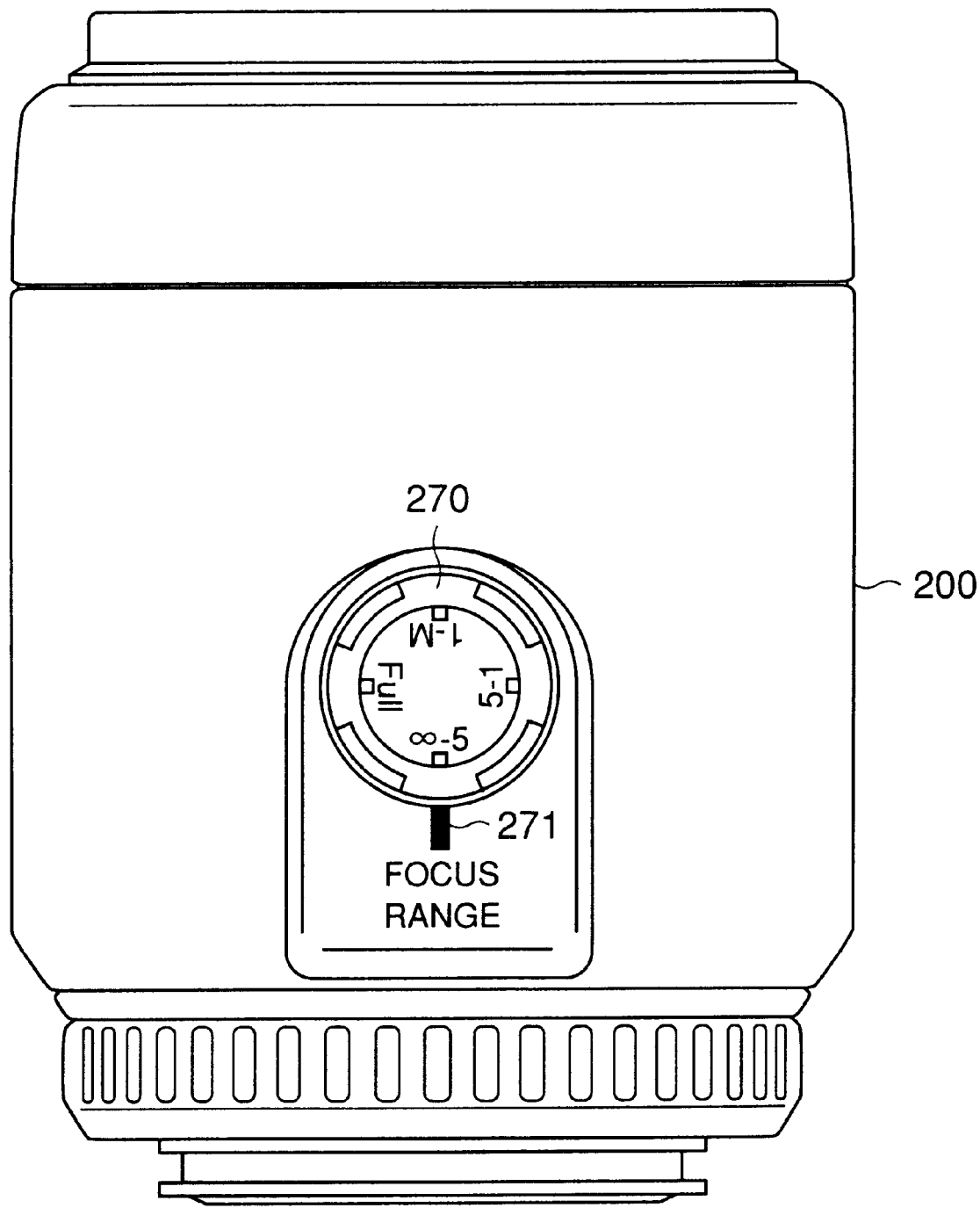
FIG. 8 is an external view showing an interchangeable lens of the second embodiment.

Although the focusing range is defined by dividing a range between the near end position and the infinity end position into two parts in the first embodiment, three focusing ranges can be set in the second embodiment. This is performed by rotating a focusing range setting switch (i.e., electrical switch) 270 shown in FIG. 8. The focusing range setting switch 270 is constructed in such a manner that the focusing range is electrically changed similarly to the focus limit switches 147 and 211 of the first embodiment.

When a mark "∞-5" is set to an indicator 271, for example, the focusing range is set to a first focusing range from infinity (infinity end position) to 5 (m) (first limit position). When a mark "5-1" is set to the indicator 271, the focusing range is set to a second focusing range from 5 (m) (first limit position) to 1 (m) (second limit position). When a mark "1-M" is set to the indicator 271, the focusing range is set to a third range from 1 (m) (second limit position) to the shortest distance (the near end position). When a mark "Full" is set to the indicator 271, the focusing range is from the near end position to the infinity end position.

In Step S401, a focus limit flag is reset to 0. In Step S402, it is determined whether the focusing lens groups 201 and 202 are being moved. When the focusing lens groups 201 and 202 are stopped, the focus limit check process routine ends, and when the focusing lens groups 201 and 202 are being moved, a focus limit check process is performed in Step S403 and Steps following Step S403.

In Step S403, a lens communication is carried out, so that a distance code, indicating the present position of the focusing lens groups 201 and 202, is input to the camera control circuit 110. In Step S404, it is determined whether the focusing range is set by focus limit switch 147 or 211. When the focusing range is not set, the focus limit check process routine ends, and when the focusing range is set, Step S405 is executed.

In Step S405, based on the distance information Dv' corresponding to the distance code indicating the present distances of the focusing lens groups 201 and 202, an APEX value Dv of the object distance, corresponding to the present position of the focusing lens groups 201 and 202, is calculated.

In Step S406, a focusing range change data is set. In this embodiment, as shown in Table 2, Dv "5" corresponding to 5 (m) is set to a first limit, and Dv "0" corresponding to 1 (m) is set to a second limit.

In Step S411, it is determined whether the first focusing range "∞-5" is set. When the first focusing range is set, Step S412 is executed, in which it is determined whether the focusing lens groups 201 and 202 are moving from the infinity end position to the near end position. When the focusing lens groups 201 and 202 are moving from the near end position to the infinity end position, the focus limit check process routine ends without executing Step S414, since the focusing lens groups 201 and 202 must not stop when moving into the first focusing range bounded by the first limit. Conversely, when the focusing lens groups 201 and 202 are moving from the infinity end position to the near end position, Step S413 is executed, in which it is determined whether the APEX value Dv, indicating the present position of the focusing lens groups 201 and 202 obtained in Step S405, is less than the first limit, which corresponds to the 5 (m) object distance.

When it is determined in Step S413 that the APEX value Dv of the present position is less than or equal to the first limit, the focusing lens groups 201 and 202 have reached the first limit position bounding the first focusing range "∞-5", and therefore, Step S414 is executed in which the focus limit flag is set to 1, and the focus limit check process routine ends. Conversely, if the APEX value Dv of the present position is greater than or equal to the first limit, Step S414 is skipped, and the focus limit check process routine ends.

When it is determined in Step S411 that the first focusing range (i.e., from infinity (infinity end position) to 5 (m) (first limit position)) is not selected, Step S415 is executed in which it is determined whether the second focusing range (i.e., from 5 (m) (second limit position) to 1 (m) (first limit position)) is selected. When the second focusing range is selected, Step S416 is executed in which it is determined whether the focusing lens groups 201 and 202 are moving from the infinity end position to the near end position. When the focusing lens groups 201 and 202 are moving from the infinity end position to the near end position, it is determined in Step S417 whether the APEX value Dv of the present position is less than the second limit which corresponds to a 1 (m) object distance.

When the APEX value Dv of the present position is less than the second limit, the focusing lens groups 201 and 202 have reached the second limit position bounding the second focusing range "5 (m)-1 (m)", and therefore, the focus limit flag is set to 1 in Step S414, and the focus limit check process routine ends. Conversely, when the APEX value Dv of the present position is greater than or equal to the second limit, the focusing lens groups 201 and 202 have not reached the second limit bounding the second focusing range, and therefore, the focus limit check process routine ends without executing Step S414.

When it is determined in Step S416 that the focusing lens groups 201 and 202 are moving from the near end position to the infinity end position, Step S418 is executed in which it is determined whether the APEX value Dv of the present position is greater than the first limit corresponding to the 5 (m) object distance. When the APEX value Dv of the present position is greater than the first limit, since the focusing lens groups 201 and 202 have reached the first limit bounding the second focusing range, Step S414 is executed, and then, the focus limit check process routine ends. Conversely, when the APEX value Dv of the present position is less than or equal to the first limit, since the focusing lens groups 201 and 202 have not reached the first limit bounding the second focusing range, the focus limit routine ends without executing Step S414.

When it is determined in Step S415 that the second focusing range (from 5 (m) to 1 (m)) is not selected, it is determined in Step S421 whether the third range (from 1 (m) (second limit position) to the shortest distance (near end position)) is selected. When the third range is not selected, i.e., the mark "Full" is set to the indicator 271 (see FIG. 8), the focus limit routine ends.

When it is determined in Step S421 that the third range is selected, Step S422 is executed in which the focusing lens groups 201 and 202 are moved from the infinity end position to the near end position. When the focusing lens groups 201 and 202 are moving from the infinity end position to the near end position, since the focusing lens groups 201 and 202 must not stop when moving into the second focusing range bounded by the second limit, the focus limit routine ends without executing Step S414. Conversely, when the focusing lens groups 201 and 202 are moving from the near end position to the infinity end position, it is determined in Step S423 whether the APEX value Dv of the present position is greater than the second limit which corresponds to the 1 (m) object distance.

When the APEX value Dv of the present position is greater than the second limit, the focusing lens groups 201 and 202 have reached the second limit bounding the third range, and therefore, Step S414 is executed, and the focus limit check process routine ends. Conversely, when the APEX value Dv of the present position is less than or equal to the second limit, the focusing lens groups 201 and 202 have not reached the limit positions of the focusing range, and therefore, the focus limit check process routine ends without executing Step S414.

As described above, according to the second embodiment, a range from the infinity end position to the near end position is divided into three parts to obtain three predetermined focusing ranges, and one of the first, second and third range is freely selected by operating the focusing range setting switch 270.

Note that, although the focusing range setting switch 270 is provided in the interchangeable lens 200, the switch 270 can be provided in the camera body 100. In this case, it is preferable that the selected focusing range is indicated on a display device such as a liquid crystal display.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 10-148840 (filed on May 29, 1998) which is expressly incorporated herein, by reference, in its entirety.

We claim:

1. A lens movement control device, comprising:
   a lens moving mechanism that moves focusing lens groups provided in a photographing lens, along an optical axis of said photographing lens, said photographing lens comprising an interchangeable lens detachably mounted on a camera body in which said lens movement control device is provided;
   an electrical switch that electrically determines a focusing range within which said focusing lens groups can be moved, said electrical switch being provided in the camera body;
   a lens positioning sensing system that electrically senses lens position information regarding positions of said focusing lens groups along said optical axis;
   said lens moving mechanism moving said focusing lens groups within said focusing range, based on said lens position information and said focusing range; and
   a lens position comparing system that converts said lens position information into distance information and compares said distance information with a limit switch data corresponding to the focusing range determined by said electrical switch.

2. A device according to claim 1, wherein said focusing lens groups are moveable over a maximum focusing range when said focusing range is not set by said electrical switch.

3. A device according to claim 1, wherein said focusing range is changeable by said electrical switch.

4. A device according to claim 1, wherein said lens position sensing system comprises a code plate, on which a conductive pattern is formed, and a brush slidably contacting said conductive pattern, said brush being moved in accordance with axial positions of said focusing lens groups, so that said lens position is sensed.

5. A device according to claim 1, wherein said focusing lens groups are moveable between a near end position and a far end position, said electric switch setting a limit position so that said focusing lens groups are moveable in one of a first focusing range between said near end position and said limit position, and a second focusing range between said limit position and said far end position, said limit position being located between said near end position and said far end position.

6. A device according to claim 1, wherein said focusing lens groups are moveable between a near end position and a far end position, said electric switch setting first and second limit positions which are located between said near end position and said far end position, so that said focusing lens groups are moveable in one of a first focusing range between said near end position and said first limit position, a second focusing range between said first and second limit positions, and a third range between said second limit position and said far end position.

* * * * *